United States Patent [19]

Jetzinger

[11] Patent Number: 4,711,074
[45] Date of Patent: Dec. 8, 1987

[54] MOWING AND CHOPPING MACHINE

[76] Inventor: Franz Jetzinger, Schindau 31, A-3364 Neuhofen, a.d. Ybbs, Austria

[21] Appl. No.: 828,640

[22] Filed: Feb. 11, 1986

[51] Int. Cl.$^4$ ...................... A01D 34/66; A01D 34/73
[52] U.S. Cl. ...................................... 56/13.6; 56/255; 56/295; 56/DIG. 17
[58] Field of Search .................. 56/6, 12.7, 13.6, 13.8, 56/14.1, 255, 295, DIG. 17, DIG. 20, DIG. 22

[56] References Cited

U.S. PATENT DOCUMENTS

| | | |
|---|---|---|
| 2,968,354 | 1/1961 | Berry . |
| 4,019,308 | 4/1977 | Quick ..................................... 56/295 |
| 4,110,959 | 9/1978 | Oosterling et al. ................... 56/295 |
| 4,202,156 | 5/1980 | Golyanovsky et al. ............. 56/13.6 |
| 4,345,420 | 8/1982 | Oosterling et al. .................... 56/295 |
| 4,397,136 | 8/1983 | McLeod . |
| 4,538,402 | 9/1985 | Müller ..................................... 56/6 |

FOREIGN PATENT DOCUMENTS 116532 8/1984 European Pat. Off .
1283550 7/1972 United Kingdom .

Primary Examiner—Stephen J. Novosad
Assistant Examiner—Bruce M. Kisliuk
Attorney, Agent, or Firm—Kurt Kelman

[57] ABSTRACT

The mowing and chopping machine comprises at least two rotors, which are rotatable about vertical axes, which are spaced apart transversely to the direction of travel of the machine. Each rotor comprises a tooth-carrying disc and a plurality of cutting rotor teeth, which are angularly spaced apart and pivoted to said disc by means of vertical pins and protrude from the periphery of said disc. The rotor teeth are either curved upwardly and downwardly out of the plane of the disc or are composed of a plurality of superimposed cutter blades. A fixed backing cutter is provided in the generally triangular space defined by the flight paths described by the rotor teeth. In order to prevent a loosening of the rotor teeth and to ensure that the material to be processed will be effectively and gently chopped, the flight paths of the rotor teeth of adjacent rotors do not overlap and the radially inner portions of the rotor teeth or blade holders of each rotor extend between and are in sliding contact with the tooth-carrying discs and with a second disc of the rotor. Each of said rotors may comprise two of said additional discs, which are disposed on opposite sides of said tooth-carrying disc, or each rotor may comprise said tooth-carrying disc and one additional disc. The backing cutter has at least four of said knife edges for cooperating with said rotor teeth.

18 Claims, 15 Drawing Figures

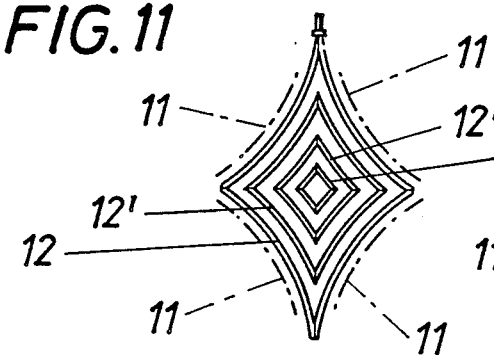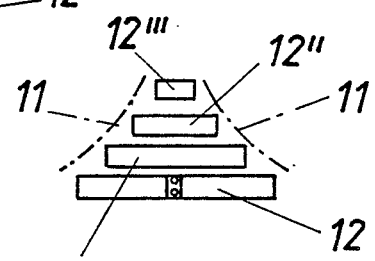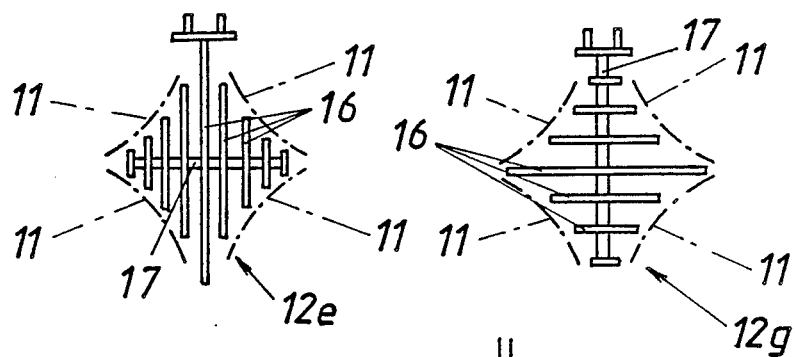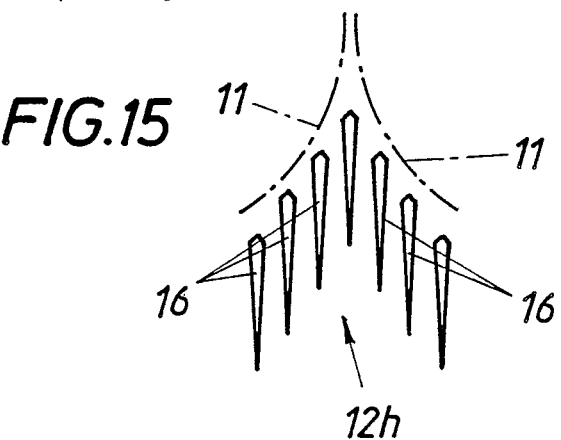

MOWING AND CHOPPING MACHINE

BACKGROUND OF THE INVENTION

1. Field of the Invention

This invention relates to a mowing and chopping machine comprising at least two rotors, which are rotatable about respective vertical axes, which are spaced apart transversely to the direction of travel of the machine and consist of tooth-carrying discs, which extend in a common horizontal plane and carry cutting rotor teeth, which are pivoted to the disc near its periphery by means of vertical pins and are curved upwardly or downwardly from the plane of the disc or consist each of a plurality of superimposed cutter blades, and at least one fixed backing cutter, which is disposed in the generally triangular space between the flight paths of the rotor teeth of adjacent rotors.

2. Description of the Prior Art

Such a machine is known from EP-A No. 0 116 532. Each tooth-carrying disc carries rotor teeth differing in length at the top and bottom of the disc, respectively, so that the flight paths described by the radially outer ends of the rotor teeth of adjacent rotors overlap without a risk of collisions between the rotor teeth rotating in the same plane. The arrangement of adjacent rotors close to each other affords the advantage that no strips of uncut plants will be left on the field. Two rotor teeth which are carried by each disc near its periphery consist of pairs of teeth which extend above and below the plane of the disc, respectively, and are pivoted about a common pin, which is fixed in the disc, so that said rotor teeth are movable to a position in which they protrude from the periphery of the disc. But that arrangement involves the danger that when the pin has become worn the rotor teeth may tilt upwardly or downwardly from the plane of the disc and the outer ends of rotor teeth which are curved upwardly and downwardly from the plane of the disc may collide although the flight paths of said outer ends were initially spaced apart. When the revolving rotor teeth strike against an obstacle, they can perform a relatively large angular movement about the axis of the pin toward the axis of the rotor because such angular movement is hardly limited. Finally, the crop material which has been cut off is not sufficiently chopped because the backing cutters do not sufficiently extend into the triangular space between the flight paths of the rotor teeth and have only one or, at most, two knife edges even if each rotor tooth consists of a plurality of superimposed cutter blades.

It is known from U.S. Pat. No. 2,968,304 to provide a mowing machine in which all rotor teeth are equal in length and revolve in a common horizontal plane. That machine comprises two outer rotors and an intermediate rotor, which is offset from the outer rotors in the direction of travel. That arrangement increases the dimensions and weight of the machine as well as its power requirement. Another disadvantage resides in that the rotor teeth are not pivoted to the tooth-carrying discs but are rigidly fixed to the discs and extend in radial directions so that the rotor teeth can easily be damaged when they strike against an obstacle.

Each rotor tooth of the known machine described last terminates in a three-pronged fork and fixed backing cutters are provided, which conform to said trident. But in spite of the backing cutters the chopping action is not satisfactory because the backing cutters are secured to the side walls and/or the rear walls of the machine housing so that each backing cutter can cooperate only with one rotor tooth at a time whereas the material to be processed is not acted upon by the teeth of adjacent rotors and by at least one backing cutter in the triangular space. Besides, the material being processed may be jammed between the backing cutters and the rotor teeth, which move only at a small distance from the backing cutters.

Another known machine, which is disclosed in British Patent Specification No. 1,283,550, comprises two juxtaposed rotors, which are spaced a relatively large distance apart and carry rotor teeth, which are not mounted at the periphery of discs lying in a common plane but are mounted on short, flat arms, which are carried by the rotor shafts and disposed on different levels. On the forward and rear sides of the two rotors, backing cutters or scrapers are provided between the two rotors and said backing cutters or scrapers consist each of a double comb so that the rotor teeth revolving on different levels can move between the teeth of the comb. A disadvantage of that known machine resides in the large distance between the rotors and in the fact that a relatively wide web is provided between the teeth of the comb-shaped backing cutters so that uncut material will be left between the rotors unless the crop to be cut has been grown in rows.

Similar remarks are applicable to another known machine, which comprises a plurality of superposed rotor shafts, which are forwardly inclined and carry a plurality of tooth-carrying discs. A backing cutter is associated with the teeth of each disc and is mounted on the inclined front wall of the machine frame (U.S. Pat. No. 4,397,136). The problems arising in machines having widely spaced apart rotors are entirely different because it is not necessary to make sure that the crops are uniformly removed from a field or meadow in the entire width of the machine without leaving strips of uncut crops.

SUMMARY OF THE INVENTION

It is an object of the invention to eliminate the disadvantages which have been described and so to improve the mowing and chopping machine described first hereinbefore that the rotor teeth will not become loose as the result of wear, the pivotal movement of the rotor teeth toward the rotor shaft will be limited, and the crop which has been cut will be effectively chopped without deterioration. These objects should be accomplished in a machine which is structurally simple and has a low power requirement.

The object set forth is accomplished in accordance with the invention in that the flight path described by the rotor teeth of each rotor is disposed in a vertical projection outside the flight path described by the rotor teeth of the adjacent rotor, the rotor teeth or blade holders are in sliding contact at their radially inner ends with the tooth-carrying disc and a cover disc or with both discs of a two-disc rotor, and the backing cutter comprises at least four knife edges.

Because each rotor tooth is in sliding contact at its inner end with the cover disc and with the tooth-carrying disc or with the two discs of a two-disc rotor, the teeth cannot tilt about a horizontal axis even when the pivot pin or the bore formed in the tooth and receiving the pivot pin has become worn. For this reason the flight paths described by the outer ends of the rotor teeth can be closely spaced apart without a risk of a collision between revolving rotor teeth. Owing to that mounting of the teeth and to the fact that the flight paths described by the rotor teeth are very closely spaced apart, no strip of uncut crops will be left even although said flight paths do not overlap. The fact that the flight paths of the rotor teeth of adjacent rotors are close to each other but do not overlap affords also the advantage that perfectly identical teeth can be provided on the top and bottom sides of the tooth-carrying discs of all rotors and the rotors need not be staggered in the direction of travel of the machine. A further advantage afforded by the provision of cover discs or the use of two-disc rotors resides in that they limit an inward pivotal movement of the rotor teeth when they strike against an obstacle. A further important advantage is due to the provision of a backing cutter having at least four knife edges and resides in that a particularly effective chopping is achieved. That chopping action is further enhanced by the fact that the fixed backing cutter is disposed in the generally triangular space defined by adjacent rotors.

In order to increase the cutting and chopping actions, the contour of the backing cutter conforms to the profile of the flight paths of the rotor teeth of adjacent rotors, which profile is determined by the shape of the rotor teeth. A particularly desirable backing cutter comprises at least one substantially rhombic frame, which has concavely curved side members, which are formed with the knife edges. In order to increase the number of knife edges that the chopping action will be improved, the backing cutter may consist of a plurality of coaxial frames, which extend in parallel planes and are graded in size to conform to the shape of the triangular space.

Another embodiment of a backing cutter having a plurality of knife edges comprises a substantially rhombic baseplate having concavely curved side edges, which constitute knife edges, and a plurality of triangular plates, which adjoin the baseplate along its diagonals and are normal to the baseplate and have free side edges which converge to a common apex and constitute knife edges.

In an arrangement which is particularly simple and can be made in a simple manner, each backing cutter consists of a plurality of parallel individual cutter blades, which are superimposed or juxtaposed and secured to a central crossbeam.

If backing cutters of the kind mentioned last are intended to cooperate with rotors having rotor teeth which are curved upwardly and downwardly out of the plane of the tooth-carrying disc, the backing cutter is preferably symmetrical and its backing teeth comprise a centrally disposed, longest backing tooth and additional backing teeth, which are disposed above and below the central tooth or on opposite sides thereof and decrease in length as their distance from the central backing tooth increases.

In an embodiment of the invention, the backing teeth which are superimposed or juxtaposed are staggered in the direction of the movement imparted by the rotors to the material to be processed in said triangular space. In such an arrangement, the knife edges do not all act on said material at the same time but the knife edges of the backing teeth will act on said material in succession so that the power requirement is reduced.

In order to reduce the risk of a jamming of the material being processed at a backing cutter comprising a plurality of backing teeth, each backing tooth may consist of a double wedge. It may also be desirable to provide the backing cutter with serrated knife edges.

In an arrangement which is particularly simple and can be made in a simple manner, each backing cutter consists of a plurality of parallel individual cutter blades, which are superimposed or juxtaposed and secured to a central crossbeam.

If backing cutters of the kind mentioned last are intended to cooperate with rotors having rotor teeth which are curved upwardly and downwardly out of the plane of the tooth-carrying disc, the backing cutter is preferably symmetrical and its backing teeth comprise a centrally disposed, longest backing tooth and additional backing teeth, which are disposed above and below the central tooth or on opposite sides thereof and decrease in length as their distance from the central backing tooth increases.

In an embodiment of the invention, the backing teeth which are superimposed or juxtaposed are staggered in the direction of the movement imparted by the rotors to the material to be processed in said triangular space. In such an arrangement, the knife edges do not all act on said material at the same time but the knife edges of the backing teeth will act on said material in succession so that the power requirement is reduced.

In order to reduce the risk of a jamming of the material being processed at a backing cutter comprising a plurality of backing teeth, each backing tooth may consist of a double wedge. It may also be desirable to provide the backing cutter with serrated knife edges.

BRIEF DESCRIPTION OF THE DRAWING

FIGS. 11 and 12, respectively, are an elevation and a top plan view, respectively, showing a different backing cutter.

FIGS. 13 and 14 are elevations showing additional embodiments of backing cutters.

FIG. 15 is a top plan view showing a backing cutter having double-wedge-shaped backing teeth.

DESCRIPTION OF THE PREFERRED EMBODIMENTS

Figure 1:
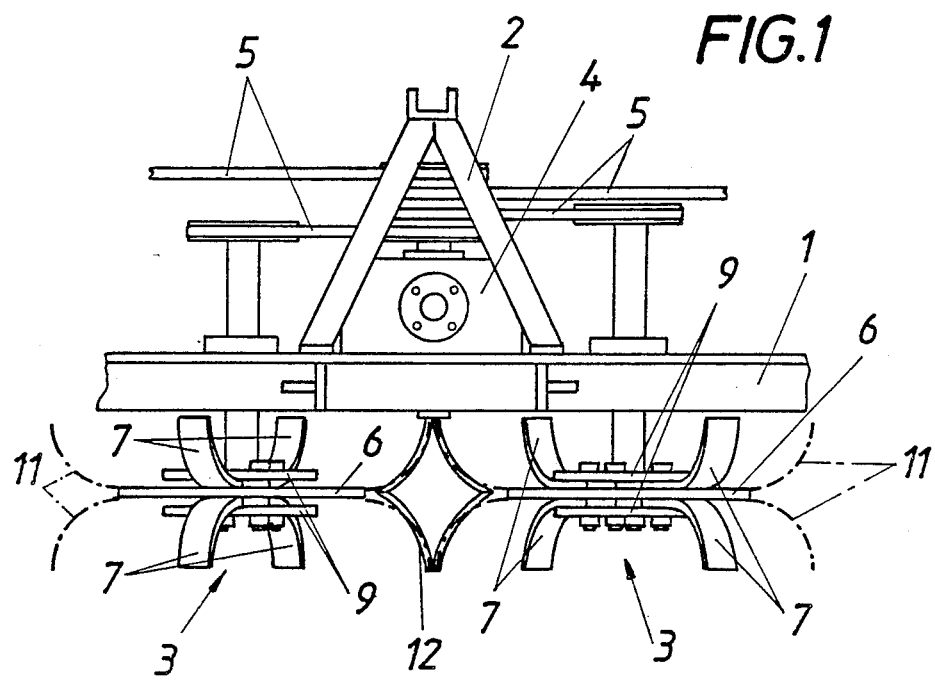
FIG. 1 is a fragmentary front elevation showing a part of a mowing and chopping machine.
Figure 3:
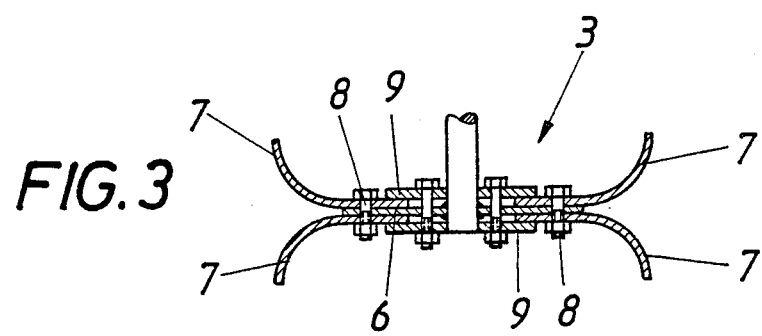
FIGS. 3 to 6 are sectional views showing various rotors.
Figure 4:
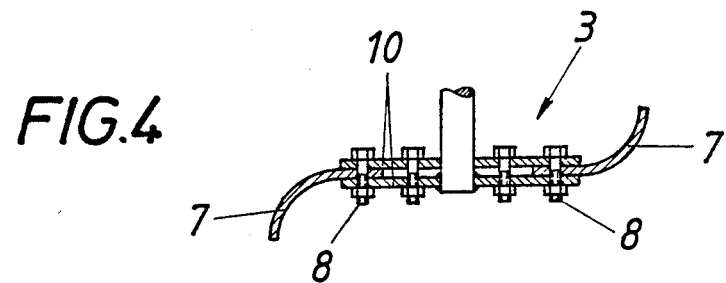
Figure 5:
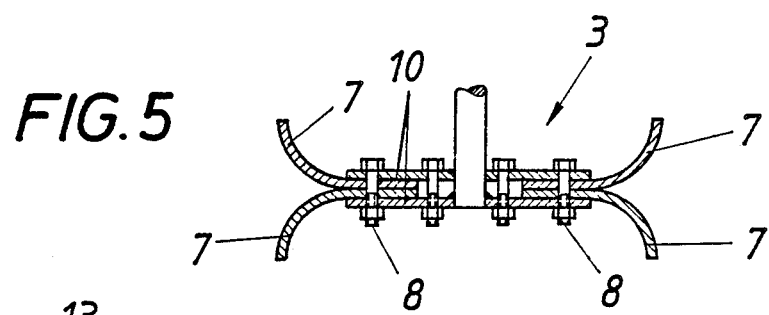

A plurality of rotors 3 having a vertical axis each are mounted one beside the other in a row in a machine frame 1, which comprises a mounting bracket 2 for connection to the three-link linkage of an agricultural tractor. The rotors 3 are driven from a power take-off shaft of the tractor via an angle drive 4 and a vee belt drive 5. Each rotor 3 carries a tooth-carrying disc 6. The discs 6 lie in a common horizontal plane and are provided each with angularly spaced apart pivoted cutting rotor teeth 7, which protrude from the periphery of the disc and are curved upwardly and downwardly, respectively, out of the plane of the disc. Each pair of upper and lower rotor teeth 7 are pivoted to the associated disc 8 by means of a vertical pin 8. The teeth 7 carried by each disc comprise a first set of teeth which are curved upwardly from the plane of the disc and a second set of teeth which are curved downwardly from the plane of the disc. In the embodiment shown in FIGS. 1 to 3, the radially inner end of each tooth 7 extends between and is in sliding contact with the tooth-carrying disc 6 and one of two cover discs 9, which are provided on opposite sides of the tooth-carrying disc 6. Alternatively, each rotor 3 may consist of two discs 10 and the teeth 7 may be mounted between and in sliding contact with said two discs 10 in the manner shown in FIGS. 4 and 5.

Figure 2:
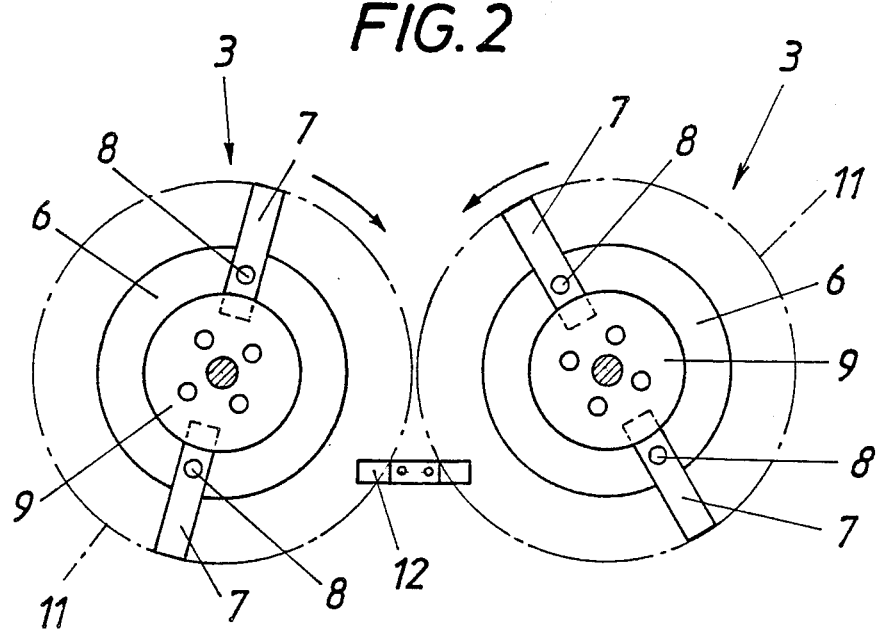
FIG. 2 is a top plan view showing the rotors and the backing cutter of the machine of FIG. 1.

It is apparent from FIG. 2 that in a vertical projection the flight path 11 described by the teeth 7 of one rotor 3 extends entirely outside the flight path 11 described by the teeth 7 of the adjacent rotor 3 although the distance between said flight paths 11 is very small. A backing cutter 12 is fixed to the frame 1 and disposed in a space of a generally triangular horizontal cross section between the flight paths 11 of the teeth 7, which space trails a like space between the flight paths in the directions of rotation of the rotors. The knife edges of said backing cutter 12 have a contour which conforms to the contour of the flight paths 11 described by the teeth 7 of adjacent rotors. The contour of said flight paths 11 depends on the shape of the teeth 7. The backing cutter 12 comprises a substantially rhombic frame, which has side members, which are formed with concavely curved side edges, which constitute the knife edges of the backing cutter.

Figure 6:
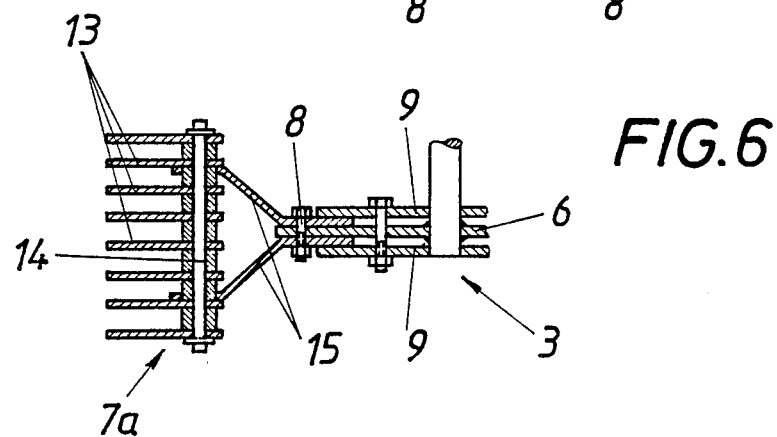

The cutting tooth 7a shown in FIG. 6 consists of a plurality of superimposed cutting blades 13, which are pivoted on a pivot 14 and are mounted in a blade holder 15, which like the teeth 7 is held between and in sliding contact with the rotor disc 6 and the cover discs 9. It will be understood that the cover discs 9 or at least one of the discs 10 of the two-disc rotor may be mounted to be displaceable in the axial direction of the rotor shaft.

Figure 7:
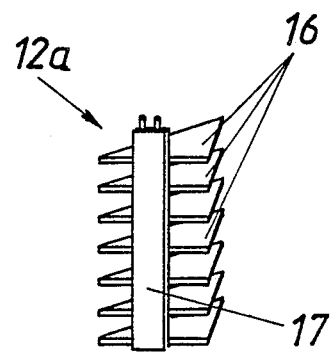
FIGS. 7 to 10 are perspective views showing various embodiments of a fixed backing cutter.
Figure 8:
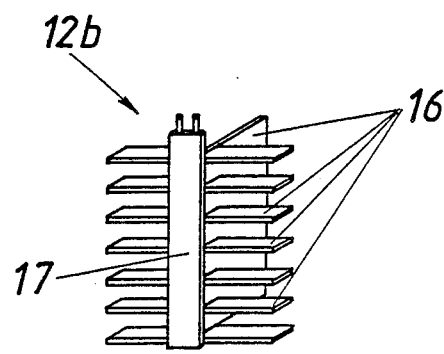
Figure 9:
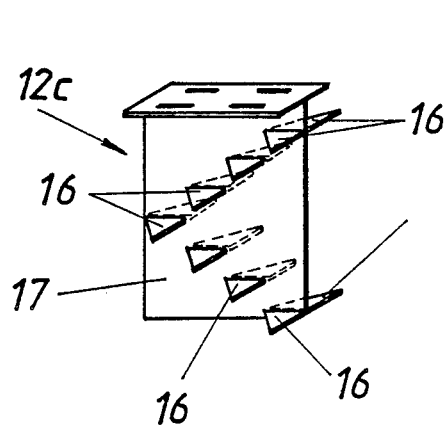

The backing cutters 12a, 12b and 12c shown in FIGS. 7 to 9, respectively, are adapted to cooperate with the rotor teeth shown in FIG. 6. Each of the backing cutters 12a, 12b, 12c consists of a plurality of superimposed parallel backing teeth 16, which are fixed to a central crosspiece 17. Regardless of its design, the backing cutter is adjustably secured to the machine frame 1 so that the backing cutter can be adjusted to a larger or smaller depth in the generally triangular space between two rotors 3.

Figure 10:
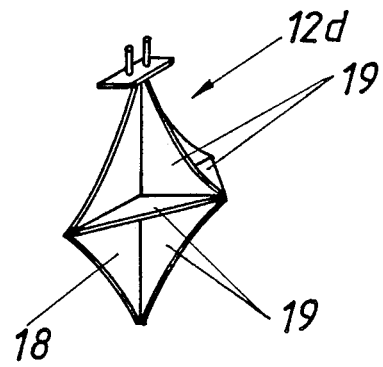

FIG. 10 shows a backing cutter 12d, which comprises a substantially rhombic baseplate 18, which has inwardly curved side edges, and triangular plates 19, which are normal to the baseplate 18 and adjoin the latter along its diagonals and have free side edges, which converge to a common apex. All free side edges of the baseplate 18 and of the triangular plates 19 constitute knife edges. Such backing cutter conforms to the flight paths described by the rotor teeth 7 in the horizontal and vertical directions.

Such an adaptation and a larger number of knife edges are provided also in the embodiment shown in FIGS. 11 and 12. In that embodiment the backing cutter comprises a plurality of coaxial frames 12, 12', 12", 12''', which extend in parallel planes and have graded sizes to conform to the triangular space between the flight paths 11. Just as the backing cutter 12c shown in FIG. 9, the backing cutter shown in FIGS. 11 and 12 affords the advantage that the frames 12, 12', 12" and 12''' or the several backing teeth do not act simultaneously but in succession on the material being processed because the backing teeth or the frames are offset from each other in the direction of the movement which is imparted by the rotors space to the material which is to be processed in the triangular space.

In the embodiment shown in FIGS. 13 and 14 a symmetrical backing cutter comprises a central crosspiece 17 and a plurality of backing teeth 16 secured to the crosspiece 17. The vertical backing teeth 16 constitute a backing tooth array 12e and the horizontal backing teeth 16 shown in FIG. 14 constitute a backing tooth 12g.

In accordance with FIG. 15, each of the vertical backing teeth 16 of the backing cutter 12h constitutes a double wedge. It is apparent that the backing teeth 16 are also staggered in the direction in which the material to be processed is converged in the triangular space.

I claim:

1. A mowing and chopping machine comprising
   (a) a frame adapted to travel in a predetermined direction of travel over a crop to be mowed,
   (b) two rotors mounted in said frame for rotation in opposite directions about respective vertical axes, the vertical axes being spaced apart transversely to said direction of travel, and each of said rotors comprising
      (1) a cutting tooth-carrying disc extending in a horizontal plane common to said discs,
      (2) two additional discs coaxial with, and vertically spaced apart from said tooth-carrying disc, the additional discs being disposed above and below an upper side and an underside of said tooth-carrying disc, respectively,
      (3) a first set of angularly spaced apart cutting teeth having a radially inner portion and a portion protruding from the periphery of the discs downwardly curved below said common plane, the inner portions of the teeth being pivoted to said tooth-carrying disc by vertical pins and extending between, and being in sliding contact with, the underside of said tooth-carrying disc and an adjacent one of said additional discs,
      (4) a second set of angularly spaced apart cutting teeth having a radially inner portion and a portion protruding from the periphery of the discs upwardly curved above said common plane, the inner portions of the teeth being pivoted to said tooth-carrying disc by vertical pins and extending between, and being in sliding contact with, the upper side of said tooth-carrying disc and an adjacent one of said additional discs, and
      (5) said rotors being rotatable about said vertical axes and said rotors and cutting teeth being so arranged that said cutting teeth describe respective flight paths closely spaced apart in a vertical projection and defining therebetween a space of generally triangular horizontal cross section, said space trailing a like space between the flight paths in the directions of rotation of the rotors, and
   (c) a backing cutter fixed to said frame and disposed in said trailing triangular space, the backing cutter having
      (1) at least four knife edges adapted to cooperate with said cutting teeth.

2. The machine set forth in claim 1, wherein said backing cutter has four knife edges for cooperating with each set of cutting teeth of both said rotors.

3. A mowing and chopping machine comprising
   (a) a frame adapted to travel in a predetermined direction of travel over a crop to be mowed, (b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolutions respective flight paths closely spaced apart and profiled in a vertical projection and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having
  (1) at least four knife edges adapted to cooperate with said cutting teeth and conforming to said profiled flight paths.

4. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
  (1) at least one substantially rhombic frame having frame members with concavely curved outer edges constituting the knife edges.

5. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane coomon to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
  (1) a plurality of coaxial frames extending in respective parallel planes and formed with said knife, the knife edges being so shaped, dimensioned and arranged that they conform to said triangular space.

6. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and (c) a backing cutter fixed to said frame and disposed in said trailing triangular space, the backing cutter having at least four knife edges adapted to cooperate with said cutting teeth and comprising
  (1) a substantially rhombic baseplate having concavely curved side edges constituting respective ones of the knife edges, and a plurality of triangular plates normal to said baseplate and adjoining the baseplate along the diagonals thereof, the triangular plates having free side edges constituting respective ones of the knife edges and converging to a common apex.

7. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plate, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
  (1) a central crosspiece and
  (2) a plurality of parallel backing teeth staggered in said predetermined direction of travel and secured to said central cross piece, the backing teeth being formed with at least part of said knife edges.

8. The machine set forth in claim 7, wherein said backing teeth are vertically spaced apart.

9. The machine set forth in claim 7, wherein said backing cutter comprises backing teeth having the shape of a double wedge.

10. The machine set forth in claim 7, wherein said knife edges of said backing cutter are serrated.

11. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
  (1) a central crosspiece and
  (2) a plurality of parallel backing teeth secured to said central cross piece and formed with at least part of said knife edges, the backing teeth constituting a symmetrical array and comprising a central backing tooth and a plurality of additional backing teeth disposed on opposite sides of, and shorter than, said central backing tooth by distances increasing with the spacing of said additional backing teeth from said central backing tooth.

12. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
  (1) a cutting tooth-carrying disc extending in a horizontal plane common to said discs,
  (2) at least one additional disc coaxial with, and vertically spaced apart from said tooth-carrying disc,
  (3) a plurality of angularly spaced apart cutting teeth having a radially inner portion and a portion protruding from the periphery of the discs and above and below said common plane, the inner portions of the teeth being pivoted to said tooth-carrying disc by vertical pins and extending between, and being in sliding contact with, said discs, and
  (4) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and (c) a backing cutter fixed to said frame and disposed in said trailing triangular space, the backing cutter having at least four knife edges adapted to cooperate with said cutting teeth and comprising
   (1) a central crosspiece and
   (2) a plurality of parallel backing teeth staggered in a predetermined direction of conveyance of material to be processed by the cooperation of said cutting teeth and said knife edges, the backing teeth being secured to said central cross piece and the backing teeth being formed with at least part of said knife edges, the rotation of said rotors in said triangular space imparting to said material a movement in said predetermined direction of conveyance.

13. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
   (1) a cutting tooth-carrying disc extending in a horizontal plane common to said discs,
   (2) a plurality of angularly spaced apart cutting teeth pivoted to said disc by vertical pins and protruding from the periphery of the discs and above and below said common plane, and
   (3) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
   (1) a central crosspiece and
   (2) a plurality of parallel backing teeth staggered in a predetermined direction of conveyance of material to be processed by the cooperation of said cutting teeth and said knife edges, the backing teeth being secured to said central cross piece and the backing teeth being formed with at least part of said knife edges, the rotation of said rotors in said triangular space imparting to said material a movement in said predetermined direction of conveyance.

14. A mowing and chopping machine comprising
(a) a frame adapted to travel in a predetermined direction of travel over a crop to be mowed,
(b) two rotors mounted in said frame for rotation in opposite directions about respective vertical axes, the vertical axes being spaced apart transversely to said direction of travel, and each of said rotors comprising
   (1) a cutting tooth-carrying disc extending in a horizontal plane common to said discs,
   (2) a plurality of angularly spaced apart cutting teeth pivoted to said disc by vertical pins and protruding from the periphery of the discs and above and below said common plane, and
   (3) said rotors being rotatable about said vertical axes and said rotors and cutting teeth being so arranged that said cutting teeth describe during their revolution respective flight paths closely spaced apart and defining therebetween a space of generally triangular horizontal cross section, said space trailing a like space between the flight paths in the directions of rotation of the rotors, and
(c) a backing cutter fixed to said frame and disposed in said trailing triangular space, the backing cutter having at least four knife edges adapted to cooperate with said cutting teeth and comprising
   (1) a central crosspiece and
   (2) a plurality of parallel backing teeth staggered in said predetermined direction of travel and secured to said central cross piece, the backing teeth being formed with at least part of said knife edges.

15. The machine set forth in claim 14, wherein said backing teeth are vertically spaced apart and staggered in said predetermined direction of travel.

16. The machine set forth in claim 14, wherein said knife edges are concavely curved.

17. The machine set forth in claim 14, wherein said knife edges are concavely curved.

18. The machine set forth in claim 14, wherein said knife edges are staggered in two directions which are at right angles to each other.

* * * * *